United States Patent [19]

Zimmerman et al.

[11] 4,226,004
[45] Oct. 7, 1980

[54] FISH SCALE REMOVER

[76] Inventors: Jessie G. Zimmerman, R.R. 15, Box 219, Bedford, Ind. 47421; Robert T. Snider, Sr., 1439 Deloss, Indianapolis, Ind. 46201

[21] Appl. No.: 6,356

[22] Filed: Jan. 25, 1979

[51] Int. Cl.³ .............................................. A22C 25/02
[52] U.S. Cl. ..................................... 17/67; 17/11.1 R
[58] Field of Search ................... 17/67, 64, 18, 11.1 R

[56] References Cited

U.S. PATENT DOCUMENTS

| 1,327,073 | 1/1920 | Tietz | 17/18 |
| 1,694,018 | 12/1928 | Mudge et al. | 17/64 |
| 4,106,193 | 8/1978 | Fisher et al. | 17/67 X |
| 4,107,819 | 8/1978 | Saizon | 17/67 X |

FOREIGN PATENT DOCUMENTS 84253  1/1958  Denmark ..................................... 17/18

Primary Examiner—Willie G. Abercrombie
Attorney, Agent, or Firm—Woodard, Weikart, Emhardt & Naughton

[57] ABSTRACT

A device for removing scales from a fish. A drum is mounted to a tubular main body which in turn is mounted to a rotatable drive shaft. A plurality of helical springs are pivotally mounted to the outer cylindrical wall of the drum with the coils of each spring expanding when rotated to engage and remove scales from a fish.

3 Claims, 7 Drawing Figures

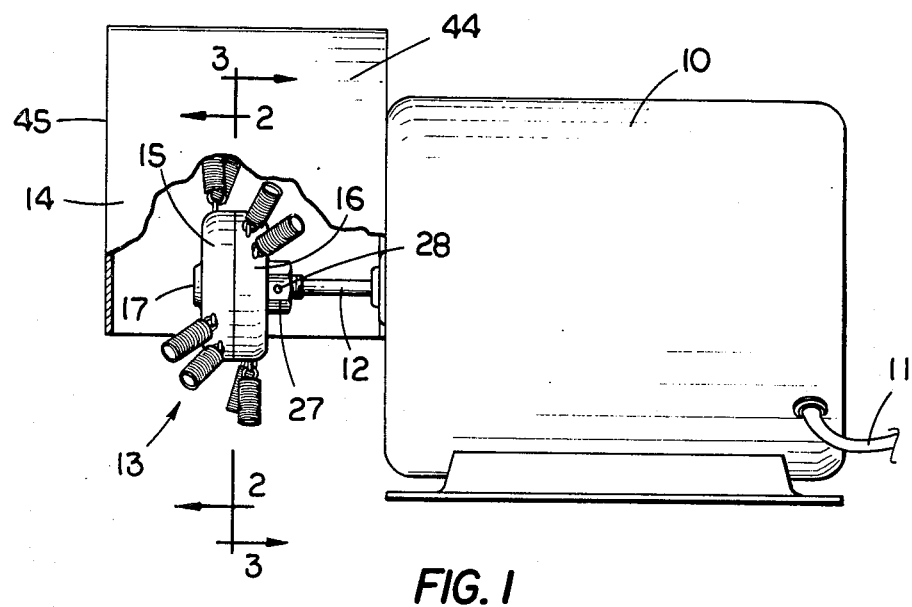
FIG. 1
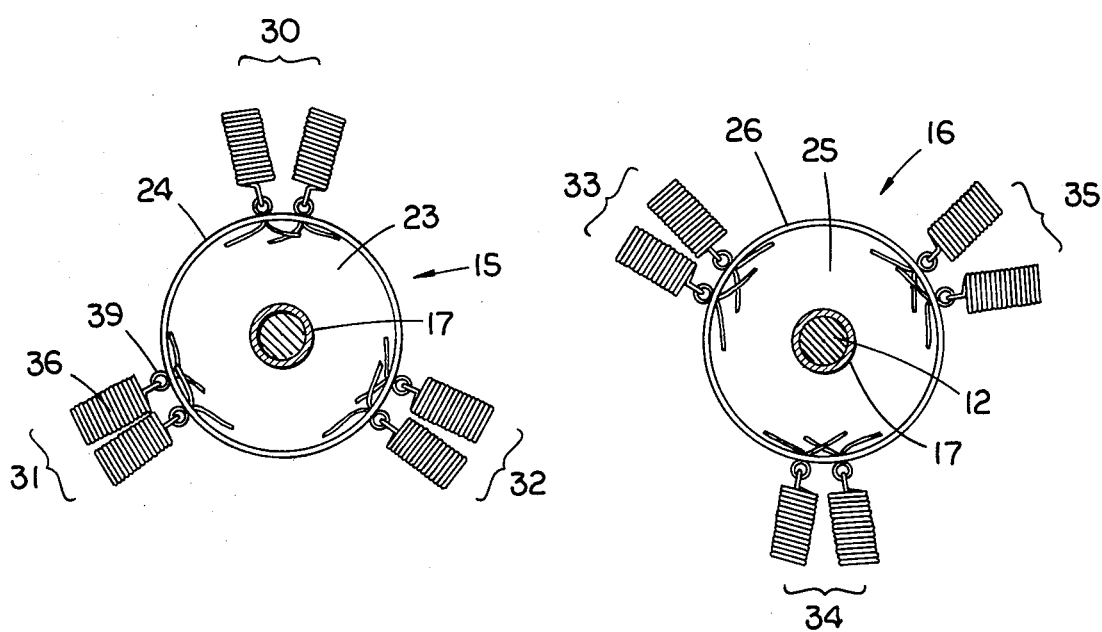
FIG. 2
FIG. 3

FISH SCALE REMOVER

BACKGROUND OF THE INVENTION

This invention is in the field of fish scalers. It is customary to remove the scales from a fish prior to cooking. Typically, this involves moving a knife or other tool against the fish in a direction opposite of the extending scales. Not only is this procedure time consuming and difficult, but it is very messy due to the scales snapping off in a variety of directions. The tool must be repeatedly moved over the same area of the fish in order to insure that all scales are removed. In many cases, it is desirable to immediately freeze the fish and remove the fish to a remote location for cleaning. In the event the fish is frozen prior to scale removal, then the scales are frozen to the fish and are difficult, if not impossible, to remove with a knife or similar tool. Industrial fish-cleaning plants remove the fish scales in a variety of manners; however, such procedures are not particularly adaptable for use by an individual fisherman who needs a relatively low-cost and simple-to-use tool for cleaning a small number of fish, one at a time. Disclosed herein is a device for removing scales from a fish which is quick and easy to use regardless of whether the fish is in a fresh or frozen state. Likewise, the device may be easily mounted and driven by a standard motor or power tool, such as a power drill.

SUMMARY OF THE INVENTION

One embodiment of the present invention is a device for removing scales from a fish comprising a rotatable shaft, a plurality of helical springs with proximal ends mounted radially on the shaft and free distal end portions to engage and pull off scales on a fish as the shaft and springs are rotated and the springs are forced against the fish, and means mounting the springs on the shaft.

It is an object of the present invention to provide a new and improved device for removing scales from a fish.

A further object of the present invention is to provide a device for efficiently removing scales from a fish in a fresh or frozen state.

Yet another object of the present invention is to provide a fish scale remover which may be driven by a conventional power tool.

Related objects and advantages of the present invention will be apparent from the following description.

BRIEF DESCRIPTION OF THE DRAWINGS

FIG. 1 is a fragmentary view of the fish scale remover mounted to a motor provided with a scale shield.

FIG. 2 is a cross-sectional view taken along a line and viewed in the direction of arrows 2—2 of FIG. 1.

FIG. 3 is a cross-sectional view taken along a line and viewed in the direction of arrows 3—3 of FIG. 1.

DESCRIPTION OF THE PREFERRED EMBODIMENT

Figure 4:
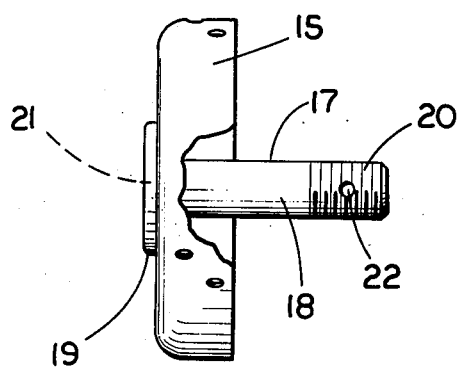
FIG. 4 is a fragmentary side view of the dish and shaft shown in FIG. 2.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a conventional electrical motor 10 connected to a source of electrical energy by wires 11. Motor 10 includes a rotatable output drive shaft 12 upon which the fish scale remover 13 is mounted. A shield 14 is mounted to motor 10 and extends partially around fish scale remover 13 to limit the outward movement of the scales as the scales are removed from the fish.

Fish scale remover 13 includes a pair of dish-configured walls 15 and 16 mounted to shaft 17 in turn mounted and secured to drive shaft 12. A plurality of helical springs are pivotally mounted to walls 15 and 16 and engage the fish scales as drive shaft 12 rotates walls 15 and 16.

Shaft 17 includes a tubular main body 18 (FIG. 4) integrally attached to an enlarged head 19 positioned at one end of the shaft with the other end 20 being provided with external threads. Passage 21 extends centrally through shaft 17 from headed end 19 to threaded end 20. Aperture 22 is positioned at end 20 and extends radially inwardly into passage 21.

Wall 15 includes a main portion 23 (FIG. 2) fixedly mounted to headed end 19 and perpendicularly arranged to shaft 17 which extends through wall 15. Wall 15 includes a continuous and circumferentially extending wall portion 24 integral with portion 23 with wall portion 24 extending axially along shaft 17 toward threaded end 20. Wall 16 (FIG. 3) includes a main portion 25 slidably mounted in perpendicular fashion to shaft 17 being integral with a continuous and circumferentially extending wall portion 26 which extends axially along shaft 17 toward headed end 19 being concentrically aligned and in contact with wall portion 24 of wall 15. An internally threaded conventional nut 27 is threadedly mounted on threaded end 20 and holds wall 16 adjacent wall 15. Further, a set screw 28 is threadedly mounted to nut 27 and extends inwardly through aperture 22 into passage 21 (FIG. 4) to engage a flat provided on drive shaft 12 which extends into shaft 17 thereby preventing relative motion between shaft 17 and shaft 12. Thus, walls 15 and 16 rotate as a unit with drive shaft 12.

Wall 15 is fixedly mounted to shaft 17 and has a dish configuration opening in a first direction toward the threaded end of shaft 17. Wall 16 likewise has a dish configuration that opens toward wall 15 in a direction toward the headed end of the shaft. Wall 16 may be removed from the fish scale remover by first unthreading nut 27 from shaft 17 and then sliding wall 16 away from wall 15 thereby allowing access to the cotter pins mounting the helical springs to walls 15 and 16. Each helical spring is pivotally mounted thereby allowing the outer distal end to move freely past and against a fish scale. The springs are arranged in pairs and are positioned in alternate fashion to walls 15 and 16 around shaft 17. For example, wall 15 is provided with three pairs of helical springs 30, 31 and 32, each positioned at 120° intervals around shaft 17. Likewise, wall 16 is provided with three pairs of helical springs 33, 34 and 35 positioned 120° around shaft 17. Wall 16 is arranged relative to wall 15 so that a pair of helical springs mounted to wall 16 is located a maximum of 60° around shaft 17 to the next pair of helical springs mounted to wall 15. The coils of each spring are in continuous contact when shaft 12 is in a nonrotational mode; however, at least some of the coils of each spring expand in spaced-apart relationship due to centrifugal force as shaft 12 is rotated thereby allowing a fish scale to extend between the coils of a spring. Thus, upon rotation of shaft 12, the coils of a spring will expand thereby allowing the spaced-apart coils of a spring to rake across a fish scale which will eventually pass between adjacent spaced-apart coils of a spring so as to be pulled from the fish.

Figure 5:
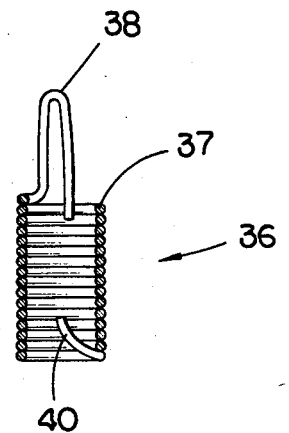
FIG. 5 is an enlarged fragmentary view of one of the springs shown in FIG. 1.
Figure 6:
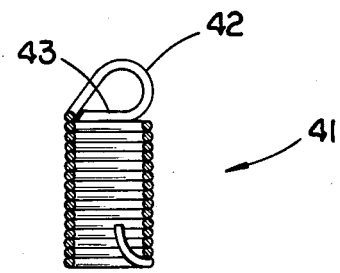
FIG. 6 is the same view as FIG. 5 only showing an alternate version of the helical spring.

Spring 36 will now be described, it being understood that an identical description applies to the remaining helical springs. Spring 36 (FIG. 5) has a coil 37 which is positioned closest to wall portion 24 of wall 15. Coil 37 then extending outwardly along the longitudinal axis of the spring and then back in an opposite direction into the central passage of the spring forming a loop 38 used to mount the helical spring to wall 15. A conventional cotter pin 39 extends through loop 38 and then through an aperture provided in wall portion 24 with the opposite ends of the cotter pin 39 being bent in opposite directions adjacent wall 24 preventing the cotter pin from accidentally falling from wall 15. The opposite end 40 of spring 36 extends into the central passage of the spring for safety reasons and to prevent the free distal end of the spring from cutting or gouging the fish. An alternate version of the spring is shown in FIG. 6. Helical spring 41 is identical to spring 36 with the exception that loop 42 is formed by bending the proximal end 43 of the spring back on itself and welding the end of the coil wire to the top coil of the spring. Thus, spring 41 includes a closed loop proximal end. As shown in FIGS. 2 and 3, the pairs of springs are spaced equidistant apart and equidistant from shaft 17.

Shield 14 includes a semicircular wall 44 mounted to motor 10 with wall 44 joined to and perpendicularly arranged with respect to an outer wall 45 which extends downwardly past the axis of rotation of shaft 12 thereby preventing the scales from moving in an upward direction toward the operator.

Figure 7:
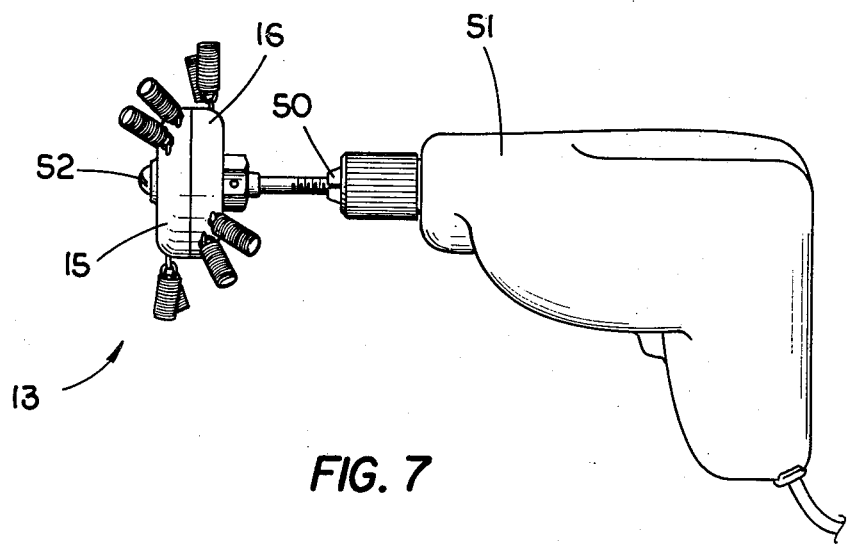
FIG. 7 is a side view of the fish scale remover shown in FIG. 1 mounted to a power drill.

In lieu of mounting the fish scale remover 13 to shaft 12 of an electric motor 10, the fish scale remover may be mounted and driven by a conventional power tool such as a power drill. Fish scale remover 13 (FIG. 7) may be mounted to the chuck 50 of a conventional power drill 51 by extending a bolt 52 through passage 21 (FIG. 4) of shaft 17 and into the jaws of chuck 50. The head of bolt 52 is positioned adjacent wall 15 whereas set screw 28 extends against a flat provided on bolt 52.

In one embodiment, a total of 12 helical springs were mounted to the fish scale remover which was rotated at approximately 1,700 revolutions per minute. The helical springs were each ½ inch long having an outside diameter of 5/16 inch with the spring wire being 0.035 inches in diameter. Walls 15 and 16 had an approximate wall thickness of 0.042 inches with shaft 17 having an outside diameter of ¼ inch.

The invention claimed is:

1. A device for removing scales from a fish comprising:
   a rotatable shaft;
   a plurality of helical springs with proximal ends mounted radially on said shaft and free distal end portions to engage and pull off scales on a fish as said shaft and springs are rotated and said springs are forced against the fish; and
   means mounting said springs on said shaft and wherein said means includes a drum mounted to said shaft with an outer cylindrical wall upon which said proximal ends are mounted, said cylindrical wall being mounted to and extending axially along said shaft which extends therethrough, said drum includes mounting means extending between and securing said cylindrical wall to said shaft, said springs are pivotally mounted to said cylindrical wall.

2. A device for removing scales from a fish comprising:
   a rotatable shaft;
   a plurality of helical springs with proximal ends mounted radially on said shaft and free distal end portions to engage and pull off scales on a fish as said shaft and springs are rotated and said springs are forced against the fish; and
   means mounting said springs on said shaft and wherein said means includes:
   a first dish-configured wall fixedly mounted to said shaft and opening in a first direction and a second dish-configured wall removably mounted to said shaft and opening toward said first dish-configured wall in a direction opposite said first direction;
   said springs are arranged in pairs and spaced 60° apart in alternate fashion on said first dish-configured wall and said second dish-configured wall.

3. A device for removing scales from a fish comprising:
   a rotatable shaft;
   a plurality of helical springs with proximal ends mounted radially on said shaft and free distal end portions to engage and pull off scales on a fish as said shaft and springs are rotated and said springs are forced against the fish; and
   means mounting said springs on said shaft and wherein said means includes:
   a tubular main wall with an enlarged headed one end and opposite threaded end and a passage extending from said one end to said threaded end;
   said means includes a first wall fixedly mounted to said headed one end and perpendicularly arranged to said shaft with a first continuous and circumferential wall extending axially along said shaft toward said headed end, said means further includes a second wall slidably and perpendicularly mounted to said shaft with a second continuous and circumferential wall extending axially along said shaft toward said headed one end and concentrically aligned and in contact with said first continuous and circumferential wall;
   said means include retaining means holding said first wall adjacent said second wall and mounted on said threaded end and including drive retainer means projecting radially into said passage of said shaft, said springs are pivotally mounted to said first continuous and circumferential wall and said second continuous and circumferential wall in pairs and in alternate fashion.

* * * * *